United States Patent [19]

Engelse

[11] Patent Number: 5,287,359

[45] Date of Patent: Feb. 15, 1994

[54] SYNCHRONOUS DECODER FOR SELF-CLOCKING SIGNALS

[75] Inventor: Willem Engelse, Townsend, Mass.

[73] Assignee: Digital Equipment Corporation, Maynard, Mass.

[21] Appl. No.: 682,059

[22] Filed: Apr. 8, 1991

[51] Int. Cl.$^5$ .............................................. H04J 3/12
[52] U.S. Cl. .................................. 370/100.1; 375/87; 375/120
[58] Field of Search ................ 375/95, 110, 119, 120, 375/100, 87; 370/100.1, 105.3, 84, 108; 328/155

[56] References Cited

U.S. PATENT DOCUMENTS

| 3,820,031 | 6/1974 | Smithlin | 328/119 |
| 4,012,598 | 3/1977 | Wiley | 178/69.1 |
| 4,080,572 | 3/1978 | Hastings et al. | 325/321 |
| 4,085,288 | 4/1978 | Viswanathan | 178/69.1 |
| 4,361,895 | 11/1982 | Khoudari | 375/87 |
| 4,450,572 | 5/1984 | Stewart et al. | 375/87 |
| 4,525,848 | 6/1985 | Simpson | 375/87 |
| 4,577,163 | 3/1986 | Culp | 331/1 A |
| 4,584,695 | 4/1986 | Wong et al. | 375/81 |
| 4,599,735 | 7/1986 | Surie et al. | 375/54 |
| 4,608,702 | 8/1986 | Hirzel et al. | 375/110 |
| 4,653,075 | 3/1987 | Wisniewski | 375/110 |
| 4,745,626 | 5/1988 | Wells | 375/87 |
| 4,756,011 | 7/1988 | Cordell | 375/118 |
| 4,791,386 | 11/1988 | Shiga | 331/1 A |
| 4,821,297 | 4/1989 | Bergmann et al. | 375/120 |
| 4,862,482 | 8/1989 | Patchen | 375/87 |

FOREIGN PATENT DOCUMENTS 0383557 8/1990 European Pat. Off. .
0389697 10/1990 European Pat. Off. .

OTHER PUBLICATIONS

Alexandridis, Microprocessor System Design Concepts, pp. 126–131.
Anonymous research disclosure No. 31998 dated Nov. 1990.

Primary Examiner—Douglas W. Olms
Assistant Examiner—Chau T. Nguyen
Attorney, Agent, or Firm—Cesari and McKenna

[57] ABSTRACT

A circuit for receiving and decoding Manchester-encoded communication signals such as those used in an Ethernet network. The circuit uses a single local reference clock signal to clock a shift register that temporarily stores samples of the incoming signal. A window pointer selects a particular bit of the shift register as the current output bit; the value of the window pointer is maintained by a feedback loop which tracks any phase error in the incoming signal, that the output data remains in phase with the incoming signal. The combined functions of a Manchester-decoder and retiming circuit are thus provided in a simple circuit.

20 Claims, 4 Drawing Sheets

Phase detect function table

| input from 22<br>87654321 0 | LOCK DET 34 | output 36<br>3210 | decimal |
|---|---|---|---|
| 000000001 | 1 | 1001 | -7 |
| 111111110 | 1 | 1001 | -7 |
| 000000011 | 1 | 1011 | -5 |
| 111111100 | 1 | 1011 | -5 |
| 000000111 | 1 | 1101 | -3 |
| 111111000 | 1 | 1101 | -3 |
| 000001111 | 1 | 1111 | -1 |
| 111110000 | 1 | 1111 | -1 |
| 000011111 | 1 | 0001 | +1 |
| 111100000 | 1 | 0001 | +1 |
| 000111111 | 1 | 0011 | +3 |
| 111000000 | 1 | 0011 | +3 |
| 001111111 | 1 | 0101 | +5 |
| 110000000 | 1 | 0101 | +5 |
| 011111111 | 1 | 0111 | +7 |
| 100000000 | 1 | 0111 | +7 |
| any other combination | 0 | XXXX | X |

FIG. 3

SYNCHRONOUS DECODER FOR SELF-CLOCKING SIGNALS

FIELD OF THE INVENTION

This invention relates to data communications and in particular to a circuit which synchronously detects and regenerates Manchester-encoded signals having a finite packet length.

BACKGROUND OF THE INVENTION

Peer-to-peer communication environments such as local area networks (LANs) have lately become the technique of choice for interconnecting different types of computer equipment, primarily because of their minimal expense and ease of use.

In a network using the well-known Ethernet signaling technique, the network devices, such as stations, repeaters, bridges, and the like, must include a circuit for receiving and decoding an incoming Ethernet signal. Ethernet signals are self-clocking, Manchester-encoded signals having a finite packet length. Such signals are self-clocking in the sense that they contain both data and clock information, thereby eliminating the need to transmit a separate clock signal. This is accomplished by insuring that a level transition, from zero to one or one to zero, occurs in the middle of every transmitted bit. The time duration of an Ethernet signal is limited by the maximum packet length of 1518 bytes.

Certain known techniques are especially adapted for detecting self-clocking signals. For example, U.S. Pat. No. 4,745,626, issued to Wells, describes a Manchester-encoded signal receiver in which transitions in an incoming signal are detected and then clocked into a shift register. The shift register is clocked by a local clock signal having a frequency which is a multiple of the fundamental data rate of the incoming signal. A logic circuit connected to the shift register determines when phase shifts in the incoming signal occur, so that the incoming data may be decoded without the need for a feedback circuit such as a phase locked loop.

Unfortunately, the lack of feedback in such a circuit means that when the incoming signal drifts more than a slight amount from the local clock, synchronization is easily lost.

Another technique is disclosed in U.S. Pat. No. 4,450,572, issued to Stewart et al., and assigned to Digital Equipment Corporation, the assignee of this application. In Stewart, et al. circuit, a flip-flop, exclusive-OR gate, and delay line separate the data and clock signals. The data signal is fed to a serial shift register clocked by the clock signal; an internal synchronizing circuit resynchronizes the output of the shift register to an independent clock source.

While this technique works well for its intended purpose, it does have certain shortcomings. In particular, it is asynchronous, in the sense that certain components switch in phase with the clock signal embedded in the incoming signal, and certain other components switch in phase with a local reference signal having a phase and/or frequency which differs from the embedded clock signal. In other words, a first clock signal is extracted from the Manchester-encoded incoming signal, and then use the first clock signal to sample the incoming signal to recover the input data. Once the data is recovered, the input data is re-timed by sampling it again with a second clock signal, which is a locally generated signal asynchronous to the first clock signal.

The greater the number of asynchronous clock signals in a circuit, the more complicated and expensive it becomes. A particularly vexatious problem in such a circuit is to resolve metastable conditions, which may occur when a flip-flop is clocked before its input signals reach a stable state. This condition is more likely to occur in a circuit where input signals to a flip-flop may change asynchronous to the clock signal driving the flip-flop.

Thus, it would be desirable to minimize the number of asynchronous clock signals in circuits such as an Ethernet signal decoder. In fact, it is preferable for all components of such a circuit to operate in phase with a single local oscillator, which would then minimize the cost and complexity of such a device, while improving its reliability.

SUMMARY OF THE INVENTION

In brief summary, the invention is a synchronous decoder for self-clocking signals which uses a single, high frequency reference clock signal. The incoming signal is sampled at a very high rate (compared to the Nyquist rate); a shift register temporarily stores the incoming samples. A window pointer register selects a particular bit of the shift register as the output signal. The position of the window pointer is maintained by a feedback loop which tracks any phase error in the incoming signal and shifts the window pointer accordingly. As a result, the output signal remains in phase lock with the incoming signal.

More particularly, the incoming signal is first sampled by feeding it into a high speed shift register. The shift register is clocked at a multiple of the fundamental data rate of the incoming signal, as specified by local reference signal generator.

The shift register has a sufficient number of stages so that the maximum possible offset in frequency between the locally generated reference clock signal and the actual frequency of the incoming data, multiplied by a maximum expected packet duration, is less than the transit time through the shift register. This accommodates the maximum possible phase offset, so that the window pointer will not move beyond either end of the shift register before a packet has been completely received.

A funnel selects a contiguous group of the samples contained in the high speed shift register. The location of this contiguous group is controlled by the window pointer register; the number of samples in the contiguous group typically corresponds to one half the fundamental bit time in the input signal.

The output of the funnel selector is periodically latched by a window contents register, preferably at a rate equal to the fundamental data rate of the input signal.

Any selected sample in the window contents register is directly usable as the decoded output signal, in which bit transitions are always synchronous to and thus in-phase with the single local reference signal.

The window contents register is also used by a phase detector logic circuit to provide an indication of the instantaneous phase offset of the window pointer. If the phase detector logic determines that multiple transitions or no transitions at all occur within a given window register sample, then it is assumed that synchronization to the incoming signal has been lost.

The instantaneous phase offset provided by the phase detector logic is averaged by a loop filter, which is in turn used to adjust the value of the window pointer register.

There are several advantages to this invention. The combined functions of a Manchester decoder and retiming circuit needed to adjust the difference between the incoming clock signal and a locally generated signal are effectively performed by a simple circuit consisting of a shift register, selector, and digital filter.

By oversampling the input signal, and maintaining a feedback reference pointer into the shift register in synchronism with a local reference oscillator, a simpler design is possible.

By using a single clock and shifting a reference pointer, rather than shifting the frequency or phase of a second clock signal, all the advantages of a single-clock system result.

BRIEF DESCRIPTION OF THE DRAWINGS

These and other advantages of the invention will become apparent upon reading the following description of an illustrative embodiment taken in connection with the accompanying drawings, in which:

FIG. 3 is a function table for the logical operations performed by the phase detector logic shown in FIG. 1.

DETAILED DESCRIPTION OF AN ILLUSTRATIVE EMBODIMENTS

Figure 1:
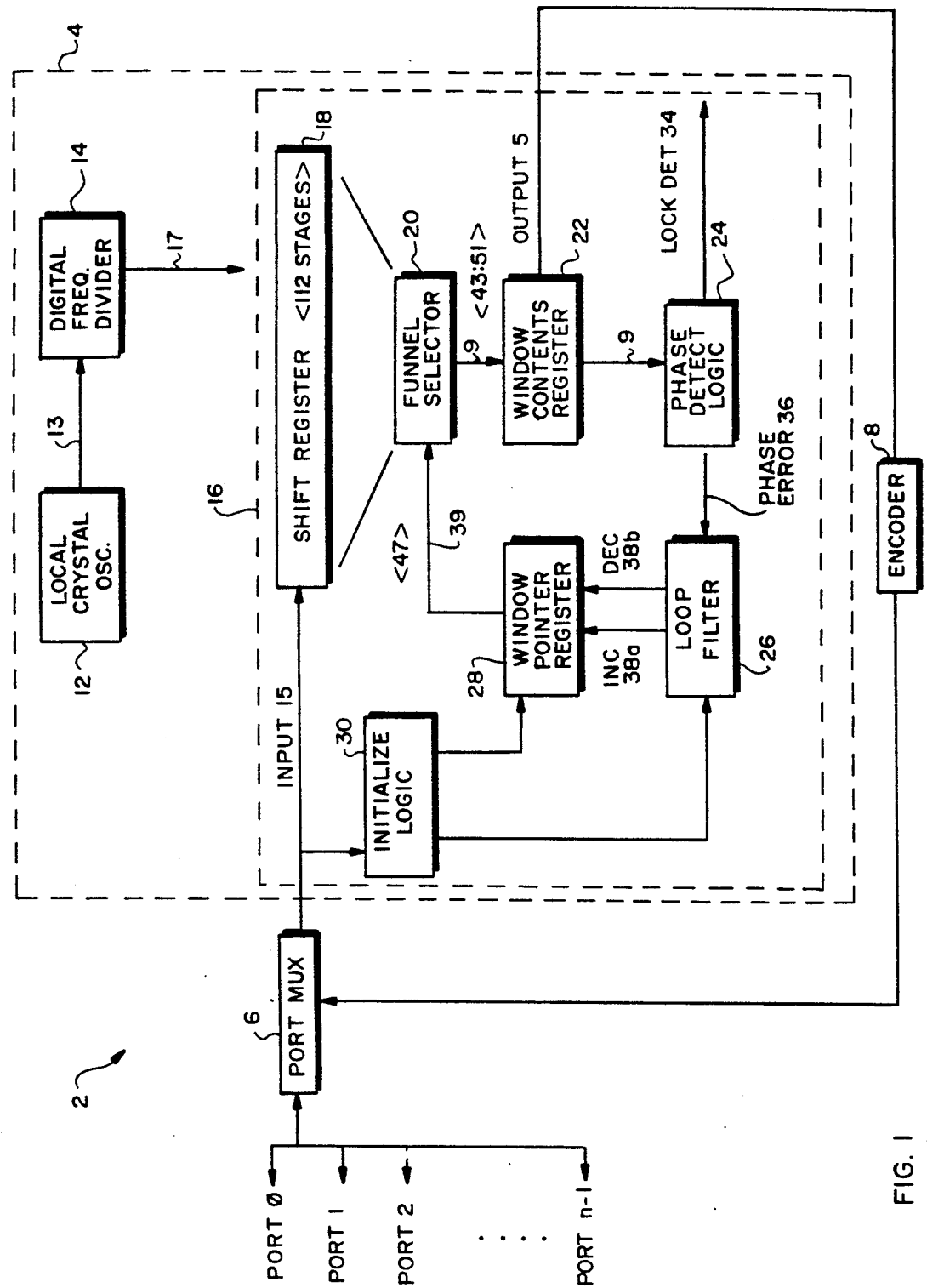
FIG. 1 is a block diagram of a synchronous decoder according to the invention.

Referring particularly now to FIG. 1, there is shown a multiport Ethernet repeater 2 which makes use of a synchronous decoder circuit 4 in accordance with the invention. The repeater 2 also includes a bi-directional port multiplexer 6 and Manchester encoder 8.

As is true for all multiport repeaters 2 known in the art, the repeater 2 accepts signals appearing on any one of port 0, port 1, port 2, . . . or port n−1, and regenerates them and retransmits them on the other ports. Thus, for example, when a signal is detected on port 1, it is forwarded through the multiplexer 6 to the decoder 4, decoded and then synchronously retimed by decoder 4 as a decoder output signal 5. The output signal 5 is in turn re-encoded by the encoder 8, and forwarded to port 0, port 2, . . ., and port n−1 via the multiplexer 6. For simplicity, the multiplexer 6 has not been detailed in FIG. 1, but it should be understood that it maintains all necessary two-way connections between the ports, the synchronous decoder 4, and the encoder 8.

A synchronous decoder circuit 4 according to the invention includes a local clock generator 12, a synchronous digital frequency divider 14, and a synchronous sampler 16. The decoder 4 is shown embodied in an Ethernet repeater 2 in FIG. 1, but it is understood that other applications for the decoder 4 are possible, wherever a synchronous decoder for a self-clocking signal is required.

The clock generator 12 provides a local reference signal 13 which is in turn divided by the frequency divider 14 to provide several synchronous clock signals 17. The synchronous clock signals 17 are used to greatly oversample an input signal 15 provided by the multiplexer 6.

For example, input signal 15 is Manchester-encoded at a fundamental bit rate of 10 MHz, with a phase transition guaranteed in the center of every fundamental bit interval of 100 nanoseconds (ns). In that case, the digital frequency divider 14 provides clock signals 17 which sample the input signal 15 at an effective rate of 160 MHz.

The synchronous sampler 16 includes a serial shift register 18, a funnel selector 20, a window contents register 22, a phase detect logic circuit 24, a loop filter 26, a window pointer register 28, and an initialization logic circuit 30. The various components of the synchronous sampler 16 are clocked by the synchronous clock signals 17 as described below.

Briefly, the window contents register 22, phase detect logic 24, loop filter 26, and window pointer register 28 maintain the window position of the funnel selector 20 so that a zero-to-one or one-to-zero transition is always present in the bit position nearest the middle of the window contents register 22.

More particularly, the shift register 18 serially receives samples of the input signal 15 clocked at the previously mentioned preferred rate of 160 MHz, which is much higher than the 10 MHz fundamental data bit rate of the input signal 15. Thus, the shift register 18 records sixteen samples per bit of the input signal 15.

In the embodiment being discussed, the shift register 18 is 112 stages long. This length is determined by the Ethernet specification for clock skew, which must be no greater than 0.01 percent of the 10 MHz nominal clock rate, and by the Ethernet 1518-byte maximum packet length. In particular, the length of the shift register 18 is dictated by the absolute maximum possible difference in time duration between the local reference signal 13 and the clock embedded in the input signal 15 over the maximum possible packet length of 1518 bytes. Other signalling specifications require a shift register having a different number of bits; the criterion which must be met is that the window pointer register 28 never point beyond either end of the shift register 18.

The funnel selector 20 passes, to the window contents register 22, the contents of a contiguous group, or window, of samples stored in the shift register 18. The position of this window is controlled by the pointer register 28. In the preferred embodiment, the window passed by the funnel selector 20 is nine samples wide, which corresponds to the number of samples take over a period equal to one-half the nominal input signal 15 data bit time of 100 ns. Thus, for example, if the sample position value "47" is fed to the funnel selector 20 by the window pointer 28, to indicate an estimate of a mid-transition sample, the values of the nine samples in positions <43:51> of the shift register 18 are available at the output of the funnel selector 20. The range of possible values for the window pointer 28 is thus "4" through "107".

The window contents register 22 is periodically latched, at the fundamental input signal rate of 10 MHz, to provide a "snapshot" of the current transition, consisting of nine samples approximately centered about the transition. The nine sample bits of the window contents register 22 are then fed to the phase detector logic 24.

The decoded synchronous output signal 5 is available as any one of the bits of the window contents register 22. Window contents register 22's clock signal will therefore be called the decoder clock signal below.

One function of the phase detector logic 24 is to determine if the synchronous sampler 16 is phase-locked to the input signal 15. If so, there will only be a single transition within the nine samples of the window contents register 22, and a lock detect signal 34 is asserted. If there are multiple transitions or no transitions in the nine-sample window, it is assumed that synchronization has been lost, and the lock detect signal 34 is de-asserted.

If the synchronous sampler 16 is phase-locked, another function of the phase detect logic 24 is to determine the distance of the single transition from the center of the window. The phase detector 24 outputs a phase error value 36 to the loop filter 26 indicating the amount of this error, in a manner which will be understood shortly.

The loop filter 26 in turn averages the phase error values 36 provided over a predetermined number of 10 MHz clock cycles, e.g. one-hundred and twenty eight, in order to prevent oscillations in the feedback loop formed by the shift register 18, funnel selector 20, contents register 22, phase detect logic 24, and window pointer register 28.

If, after averaging of the phase error values 36, a phase error is still present, the window pointer register 28 is either incremented (by asserting increment signal 38a) or decremented (by asserting decrement signal 38b), as indicated by the direction of the accumulated phase error. The loop thus tends to keep the value of the window pointer register 28 and hence the position of the funnel selector 20 such that the nine selected samples in the window remain centered about the transitions in the input signal 15.

Figure 2:
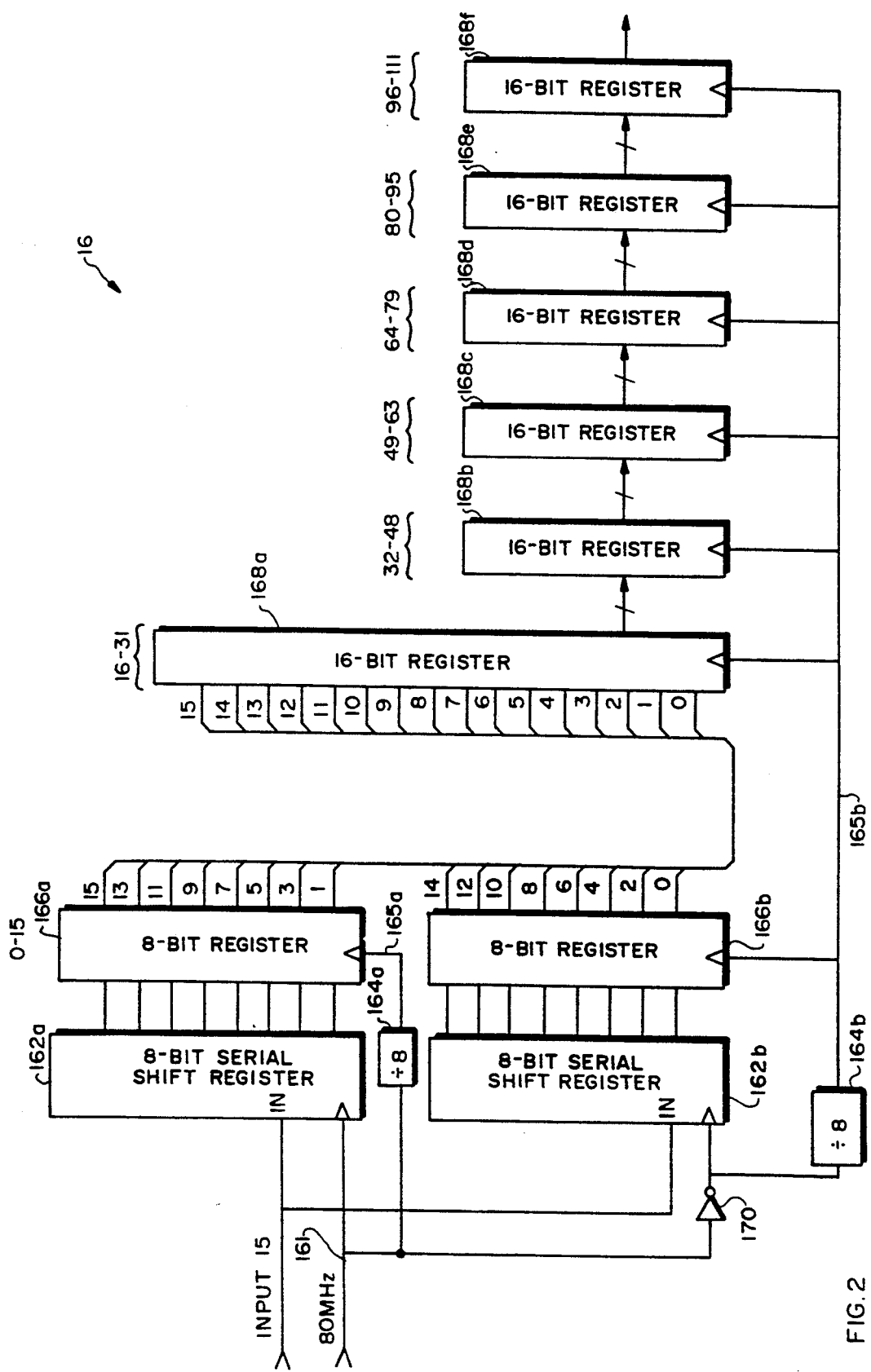
FIG. 2 is a block diagram of a preferred embodiment of the shift register shown in FIG. 1.

Referring to FIG. 2, the shift register 18 is preferably implemented as a pair of eight-bit serial shift registers 162a and 162b, a pair of divide-by-eight circuits 164a and 164b, a pair of eight-bit parallel registers 166a and 166b, and six sixteen-bit parallel registers 168a–168f.

To provide the effective 160 MHz sampling rate mentioned in connection with FIG. 1, each of the two shift registers 162a and 162b is actually clocked at an 80 MHz rate, with the two shift registers operating one hundred-and-eighty degrees out of phase with each other. Thus, one shift register 162a is clocked on the positive-going edge of every cycle of the 80 MHz clock 161, and the other shift register 162b is clocked on its negative-going edge. An inverter 170 at the clock input of the shift register 162b provides the required phase difference. The two registers 162a and 162b thus collectively sample the input signal 15 at 160 MHz, for a sample spacing of 6.25 ns.

The two 80 MHz clock signals are in turn divided by the divide-by-eight circuits 164a and 164b, to derive clock signals 165a and 165b which clock the contents of the register 162a and 162b into the registers 166a and 166b. The clock signals 165a and 165b are thus 10 MHz signals having slightly different phases, e.g., they are offset by 6.25 ns. The contents of the eight-bit registers 166a and 166b thus change only every 100 ns, in synchronism with the positive-and-negative going edges of the input 80 MHz clock signal 161, respectively.

The eight-bit parallel registers 166a and 166b are used as the first sixteen stages of the shift register 18. Register 166a thus collects odd-numbered samples and register 166b even-numbered samples; as shown in FIG. 2, their outputs are rearranged in the proper time sequence before being latched by register 168a.

The cascaded sixteen-bit parallel registers 166a through 166f are clocked by the 10 MHz clock signal 165b to provide the remaining stages of the shift register 18.

The foregoing embodiment of the shift register 18 minimizes the amount of logic circuitry which must switch at the relatively high frequency of 80 MHz with no loss of information. Only the eight-bit shift registers 162a and 162b need to be clocked at this high rate to initially capture the incoming samples. Since the eventual destination of the contents of the shift register 18, namely the window contents register 22, is clocked at a 10 MHz rate, once the incoming samples are captured, the later stages of the shift register may be clocked in parallel, at the 10 Mhz rate. By implementing the shift register 18 in this way, a significantly lower power dissipation results.

FIG. 3 is a function table which describes the logical operation of the phase detect logic 24. The phase detect logic 24 accepts the nine samples from the window contents register 22. As explained above, if only a single transition is present in the window contents, then the lock detector signal 34 is asserted, as indicated by the ones in the second column of the table. With any other combination of input bits, the lock detect signal is set to zero.

The other function of the phase detect logic 24 is to indicate the extent of any current phase offset, i.e. the distance of the transitions in the input signal 15 from the center of the window. The phase error value 36 is thus a number proportional to the distance of such transitions from the center of the window. For example, considering the third entry in the function table of FIG. 3, a sample bit group in the window content register 22 consisting of "000000011", that is, a group having a transition between bit numbers 2 and 1, is approximately two and one-half sample positions later than the desired perfectly-locked position in the center of position 4. To allow the use of integers to specify the offset of one-half of a bit, the offset is indicated by the value "−5", or twice the actual offset.

Figure 4:
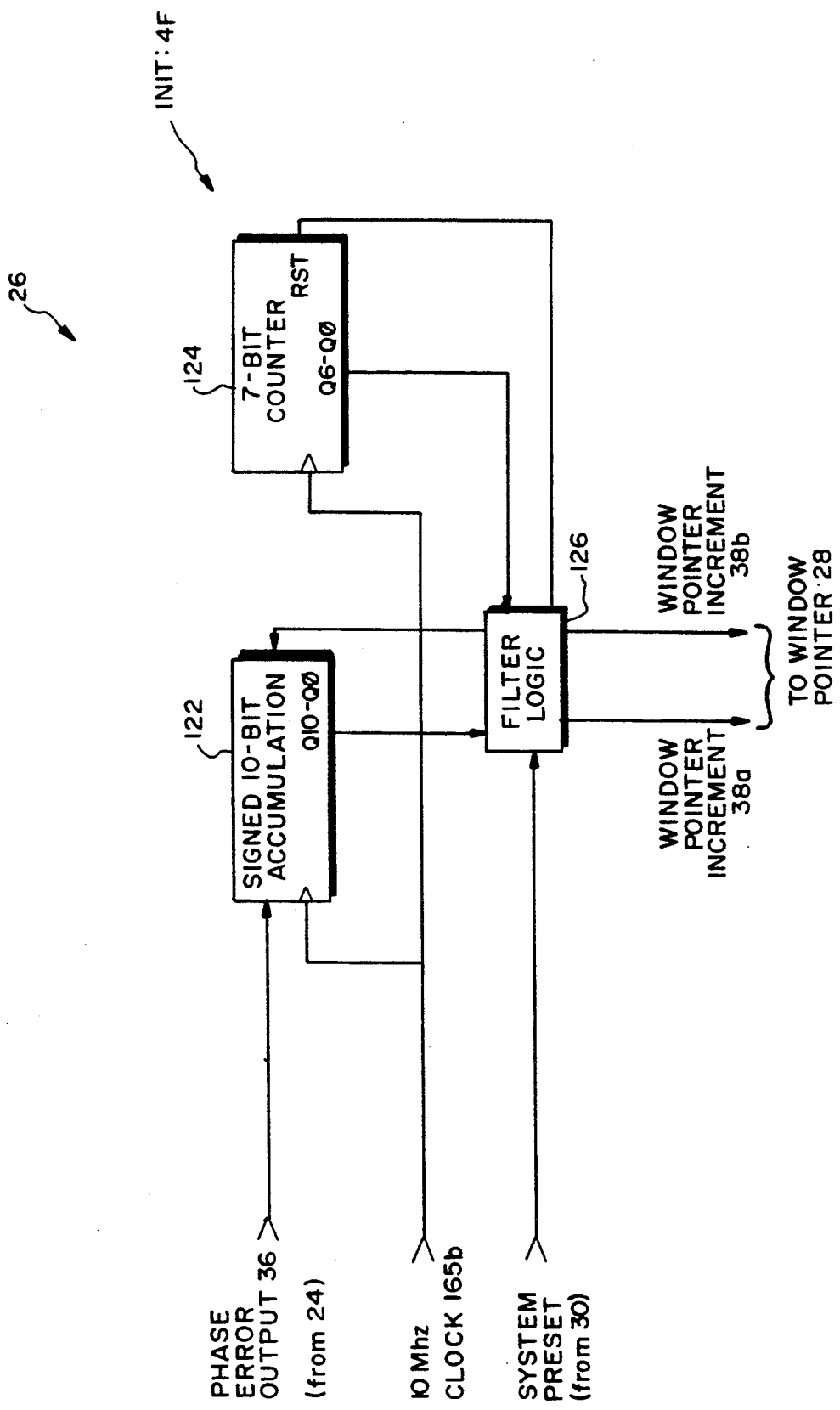
FIG. 4 is a block diagram of the loop filter shown in FIG. 1.

As in any conventional phase locked loop, the loop filter 26 averages the feedback error and thus minimizes the loop's response to noise. As shown in FIG. 4, the loop filter 26 preferably consists of a signed ten-bit accumulator 122, a seven-bit counter 124, and a filter logic circuit 126.

The signed ten-bit accumulator 122 receives the phase error signal 36 and the 10 MHz clock signal 165b. Upon every cycle of the clock signal 165b, the phase error output 36 is added to the value presently in the accumulator 122.

The seven-bit counter 124 is initialized to the value "4F" hexadecimal (hex) and is incremented upon every positive edge of the 10 MHz clock 165b.

The filter logic 126 controls the resetting of the accumulator 122 and seven-bit counter 124. It examines the value in the accumulator 122 at appropriate times, in order to determine the state of the window pointer increment signal 38a and window pointer decrement signals 38b which control the values in the window pointer register 28.

Initially, the loop operates in a capture mode, when a system reset pulse is provided by the initialization logic 30. This clears the accumulator 122. In this mode, whenever the filter counter 124 reaches the values of "5F", "6F", and "7F" (hex), or once every sixteen clock cycles, the accumulator 122 also cleared by the filter logic 126.

Whenever the accumulator 122 is cleared, the previous value in the accumulator 122 is examined by the filter logic 126 to determine whether it is greater than "15" (decimal) or less than −16 (decimal). If it indeed is greater, or less than these, respective values, the window pointer register 28 is incremented or decremented, by asserting either the pointer increment signal 38a or pointer decrement signal 38b, according to the direction of the error.

The capture mode is terminated when the seven-bit counter 124 first reaches a terminal count, that is, its first transition from the value "7F" (hex) to "00" (hex). The filter logic 12 then enters the steady-state mode. The time constant of the loop is lengthened in this mode, by clearing the accumulator 122 only when the counter 124 reaches a terminal count value of 7F (hex), e.g. every one-hundred and twenty-eight cycles. The window pointer 28 is also incremented or decremented in this mode only if the contents of the accumulator 122 are greater than 127 (decimal) or less than −128 (decimal), respectively.

As previously explained, the window pointer register 28 determines which nine contiguous samples of the shift register 18 are fed to the window contents register 18. However, the window pointer 28 must typically be set to an initial value when an input signal 15 is first detected, to minimize the loop start-up phase error. Accordingly, whenever the initialization logic 30 detects the presence of a new input signal 15, the window pointer 28 is set so that it points to a transition in sample positions "47" through "64" of the 112-stage stage shift register 18. In other words, when the initialization logic 30 detects an input signal 15, the shift register 18 is allowed to clock-in the first 112 samples. The contents of the shift register 18 are then examined by the initialization logic 30 to locate the transition nearest the center of the shift register 18. The position of this transition is then used to initialize the window pointer 28.

Upon receipt of a new input signal 15, the initialization logic 30 also forwards a system reset signal to the loop filter 22, in order for its internal filter logic 126 to perform the capture functions as previously explained.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A synchronous decoder for decoding a self-clocking incoming signal in a packet-type communication system, the synchronous decoder comprising:
    means for providing a reference clock signal having a clock rate much greater than the clock rate of the incoming signal and for providing a local clock signal independent of the incoming signal and having a clock rate approximately equal to the clock rate of the incoming signal;
    a shift register, having a plurality of stages, for storing samples of the incoming signal in synchronism with the reference clock signal;
    means for selecting, at times defined by the local clock signal, a contiguous subset of the samples stored in the shift register from a selected window position of the shift register;
    means, responsive to the contiguous subset of samples from the shift register, for detecting and accumulating any phase error in the contiguous subset of the samples; and
    means, responsive to the accumulated phase error, for adjusting the selected window position from which the contiguous samples are selected.

2. A synchronous decoder as in claim 1 wherein the shift register means has a sufficient number of stages, so that the selected window position does not move beyond either a first stage or last stage of the shift register.

3. A synchronous decoder as in claim 1 wherein the shift register means has a sufficient number of stages, so that if the difference in the clock rate of the reference clock signal and the clock rate of a clock signal embedded in the self-clocking incoming signal is at a maximum expected value, a sufficient number of samples of the incoming signal are stored in the shift register means to accommodate the selected position.

4. A synchronous decoder as in claim 1 wherein the selecting means includes a funnel selector, connected to the shift register, for providing a window contents value consisting of the sample values from a plurality of contiguous stages of the shift register, the position of the contiguous stages selected thereby being determined by the value of a window pointer register.

5. A synchronous decoder as in claim 3 wherein the means for adjusting the accumulated phase error additionally comprises:
    means, connected to receive the average error value, for incrementing or decrementing the window pointer register in accordance with changes in the average error value.

6. A synchronous decoder as in claim 1 wherein the position of the contiguous stages selected by the selecting means tends to remain in a predetermined position.

7. A synchronous decoder for decoding a self-clocking incoming signal in a packet-type communication system, the synchronous decoder comprising:
    means for providing a reference clock signal having a clock rate much greater than the clock rate of the incoming signal and for providing a local clock signal independent of the incoming signal and having a clock rate approximately equal to the clock rate of the incoming signal;
    a shift register, having a clock input connected to receive the reference clock signal, and a first stage data input connected to receive the incoming signal;
    a window pointer register containing a window pointer value;
    funnel selector means, connected to the shift register, for providing a window contents value consisting of the contents, at times defined by the local clock signal, of a plurality of contiguous stages of the shift register, the window position of the contiguous stages selected thereby being determined by the window pointer value; a window contents register containing the window contents value;
    phase detector means, for determining the location of a level transition as indicated by the values of adjacent bits in the window contents value having complementary logical values, and for providing an error value indicating the relative position of the level transition in the window contents register;

filter means, connected to receive successive error values, and to provide an average error value; and means, connected to receive the average error value and to increment or decrement the window pointer in accordance with changes in the average error value, so that the level transition in the window contents register tends to remain in a predetermined position.

8. A synchronous decoder as in claim 7 wherein the shift register has a sufficient number of stages, so that the selected position does not move beyond either a first stage or last stage of the shift register.

9. A synchronous decoder as in claim 1 wherein the shift register has a sufficient number of stages, so that if the difference in the clock rate of the reference clock signal and the clock rate of a clock signal embedded in the self-clocking incoming signal is at a maximum expected value, a sufficient number of samples of the incoming signal are stored in the shift register means to accommodate the selected position.

10. A synchronous decoder as in claim 7 additionally comprising:

means for asserting a phase lock signal when the window contents register contains a single level transition.

11. A synchronous decoder as in claim 7 additionally comprising:

means for de-asserting a phase lock signal when either no transitions or multiple transitions are present in the window contents register.

12. For use in a local area network that interconnects a plurality of devices, the devices transmitting signals over the network to each other, the transmitted signals having a self-clocking signalling format, and the transmitting signals each including data formatted into packets having a maximum time duration, a synchronous decoder for decoding one said transmitted signal received by the decoder as an incoming digital signal, the synchronous decoder comprising:

a clock generator, for generating a local clock signal and for generating a frequency divided local clock signal by frequency dividing the local clock signal, the local clock signal being independent of the incoming signal and having a clock rate much greater that the fundamental clock rate of the transmitted signals, and the frequency divided local clock signal having a clock rate approximately the same as the fundamental clock rate of the transmitted signals;

a multiple-stage shift register, connected to receive the local clock signal at a clock control input, and connected to receive the incoming digital signal at a first stage input, so that the incoming digital signal is sampled at a rate much greater than its fundamental clock rate;

a window pointer register, for storing a window pointer value;

funnel selector means, connected to the shift register and the window pointer register, for selecting the sample values from a number of adjacent stages of the shift register, the window location of the adjacent sample values being controlled by the value of the window pointer register, and the number of stages selected thereby corresponding to at least one half the fundamental bit duration of the incoming digital signal;

a window contents register, for latching the output of the funnel selector in synchronism with the frequency divided local clock signal;

output selector means, connected to the window contents register, for selecting a predetermined sample thereof to provide a decoded output signal;

phase detector means, for receiving the output of the window register, and for providing a phase error value dependent upon the position of a transition in the window register as indicated by adjacent samples having complementary values, and for asserting a phase lock signal when the window register contains a single transition, and for de-asserting a phase lock signal when either no transitions or multiple transitions are present in the window register;

loop filter means, for averaging the phase error values output by the phase error means, comprising an accumulator which accumulates successive phase error values in synchronism with the frequency-divided local clock signal, and for providing an average phase error value; and means for incrementing the value of the window pointer register when the average phase error indicates that the window register is phase-lagging, and for decrementing the value of the window pointer register when the average phase error value indicates the window register is phase-leading.

13. A synchronous decoder as in claim 12 wherein the multiple-stage shift register has a sufficient number of stages, so that if the difference in the clock rate of the frequency-divided local clock and the fundamental clock rate of the incoming digital signal is at a maximum expected value, a sufficient number of samples of the incoming signal are present in the multiple-stage shift-register, so that the selected position does not move beyond either a first stage or last stage of the shift register.

14. A method for synchronously decoding a self-clocking incoming signal in a packet-type communication system, the method comprising:

generating a reference clock signal having a clock rate much greater than the clock rate of the incoming signal;

generating a local clock signal independent of the incoming signal but having a clock rate approximately equal to the clock rate of the incoming signal;

storing samples of the incoming signal in a shift register, in synchronism with the reference clock signal;

selecting, at times defined by the local clock signal, a contiguous subset of the samples stored in the shift register from a selected position of the shift register;

maintaining an accumulated phase error in response to the value of the contiguous subset of samples from the shift register; and adjusting the selected position from which the contiguous samples are selected in response to the accumulated phase error.

15. A method as in claim 14 wherein the shift register has a sufficient number of stages, so that the selected position does not move beyond either a first stage or last stage of the shift register.

16. A method as in claim 14 wherein the shift register has a sufficient number of stages, so that if the difference in the clock rate of the reference clock signal and the clock rate of a clock signal embedded in the self-clocking incoming signal is at a maximum expected value, a sufficient number of samples of the incoming signal are stored in the shift register to accommodate the selected position.

17. A method as in claim 14 wherein the shift register has a sufficient number of stages, so that if the difference in the clock rate of the reference clock signal and the clock rate of a clock signal embedded in the self-clocking incoming signal is at a maximum expected value, a sufficient number of samples of the incoming signal are always stored in the shift register means, and so that the selected position does not change beyond either a first stage or last stage of the shift register.

18. A method as in claim 14 wherein the step of selecting a contiguous subset of samples provides a window contents value consisting of the sample values from a plurality of contiguous stages of the shift register, the position of the contiguous stages selected thereby being determined by the value of a window pointer register.

19. A method as in claim 14 additionally comprising the step of:

incrementing or decrementing the window pointer register in accordance with changes in the average error value, so that the position of the contiguous stage selected thereby tends to remain in a predetermined position.

20. A method as in claim 19 additionally comprising the steps of:

asserting a phase lock signal when the window contents register contains a single transition; and de-asserting a phase lock signal when either no transitions or multiple transitions are present in the window contents register.

* * * * *